United States Patent
Bergstrom et al.

(10) Patent No.: US 8,005,481 B2
(45) Date of Patent: Aug. 23, 2011

(54) UPLINK SCHEDULING IN A MOBILE TELECOMMUNICATION NETWORK

(75) Inventors: Joakim Bergstrom, Stockholm (SE); Johan Torsner, Masaby (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 11/921,039

(22) PCT Filed: May 26, 2005

(86) PCT No.: PCT/SE2005/000786
§ 371 (c)(1),
(2), (4) Date: Dec. 29, 2008

(87) PCT Pub. No.: WO2006/126920
PCT Pub. Date: Nov. 30, 2006

(65) Prior Publication Data
US 2009/0143071 A1    Jun. 4, 2009

(51) Int. Cl.
*H04W 4/00* (2009.01)
(52) U.S. Cl. ......... 455/450; 370/329; 370/330; 370/347
(58) Field of Classification Search .......... 370/347, 370/330, 329; 455/450
See application file for complete search history.

(56) References Cited

U.S. PATENT DOCUMENTS

| | | | |
|---|---|---|---|
| 6,236,646 B1 | 5/2001 | Beming et al. | |
| 6,680,922 B1 | 1/2004 | Jorgensen | |
| 7,145,889 B1 * | 12/2006 | Zhang et al. | 370/329 |
| 7,463,616 B1 * | 12/2008 | Earnshaw et al. | 370/347 |
| 7,551,625 B2 * | 6/2009 | Ahn et al. | 370/395.4 |
| 2004/0258026 A1 | 12/2004 | Lau | |
| 2005/0047360 A1 | 3/2005 | Love et al. | |

FOREIGN PATENT DOCUMENTS
EP    1 096 696    5/2001

OTHER PUBLICATIONS
International Search Report for PCT/SE2005/000786 mailed Jan. 25, 2006.
Written Opinion, Jan. 25, 2006 in corresponding PCT Application No. PCT/SE2005/00786.

\* cited by examiner

*Primary Examiner* — Pierre-Louis Desir
(74) *Attorney, Agent, or Firm* — Nixon & Vanderhye P.C.

(57) ABSTRACT

A node B comprises a downlink data scheduler and an uplink data scheduler. Information associated with a downlink data transfer is transferred from the downlink data scheduler to said uplink data scheduler. The uplink data scheduler schedules an uplink data transfer as a result of the transmission of the downlink data transfer.

19 Claims, 1 Drawing Sheet

UPLINK SCHEDULING IN A MOBILE TELECOMMUNICATION NETWORK

This application is the U.S. national phase of International Application No. PCT/SE2005/000786 filed 26 May 2005 which designated the U.S., the entire contents of each of which are hereby incorporated by reference.

TECHNICAL FIELD

The technology described herein relates to a method and arrangements in a mobile telecommunication network. In particular, the technology described herein relates to a Node B that facilitates an improved performance for implemented applications in said network.

BACKGROUND

Figure 1:
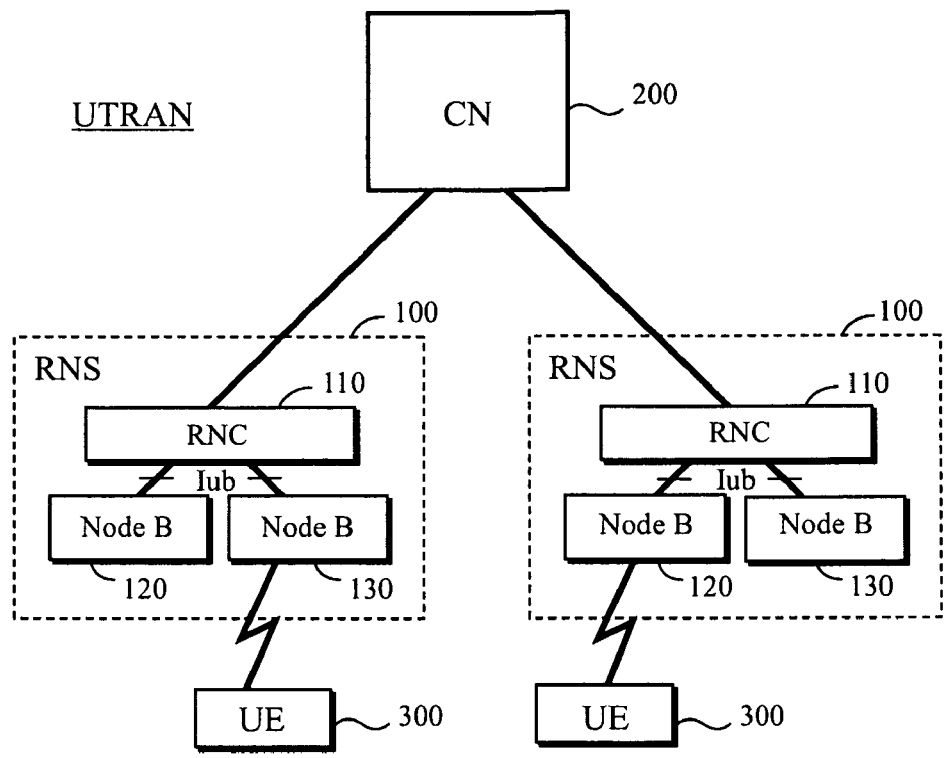
Figure 2:
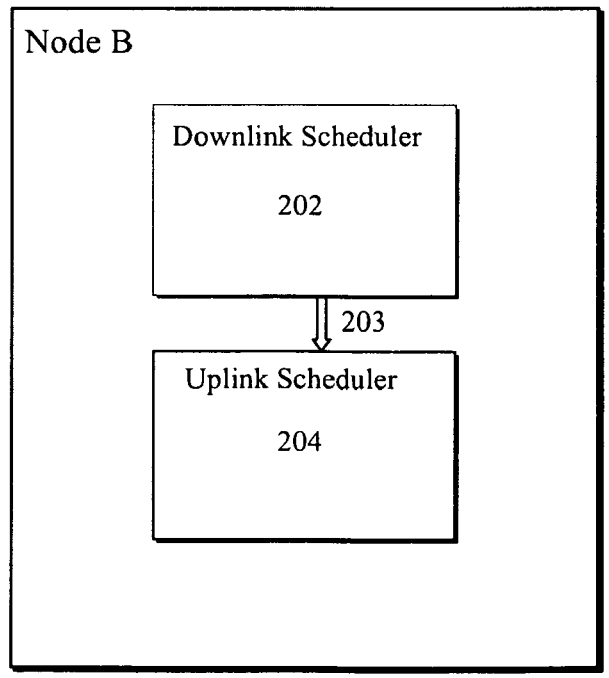

The technology described herein relates to methods and arrangements in a Node B in a UMTS terrestrial radio access network (UTRAN). The UTRAN is illustrated in FIG. 1 and comprises at least one Radio Network System 100 connected to the Core Network (CN) 200. The CN is connectable to other networks such as the Internet, other mobile networks e.g. GSM systems and fixed telephony networks. The RNS 100 comprises at least one Radio Network Controller 110. Furthermore, the respective RNC 110 controls a plurality of Node-Bs 120,130 that are connected to the RNC by means of the Iub interface 140. Each Node B covers one or more cells and is arranged to serve the User Equipment (UE) 300 within said cell. Finally, the UE 300, also referred to as mobile terminal, is connected to one or more Node Bs over the Wideband Code Division Multiple Access (WCDMA) based radio interface 150.

In 3GPP Release 6, the WCDMA standard is extended with the Enhanced Uplink concept—the Enhanced Dedicated Transport Channel, E-DCH. A further description can be found in 3GPP TS 25.309 "FDD Enhanced Uplink; Overall description". This concept introduces considerably higher peak data-rates in the WCDMA uplink. Features introduced with E-DCH include fast scheduling and fast hybrid ARQ with soft combining, both of these features are located in the Node B.

HARQ is a more advanced form of an ARQ retransmission scheme. In conventional ARQ schemes the receiver checks if a packet is received correctly. If it is not received correctly, the erroneous packet is discarded and a retransmission is requested. With HARQ the erroneous packet is not discarded. Instead the packet is kept and combined with a result of the retransmission. That implies that even if both the first transmission and the retransmission are erroneous, they may be combined to a correct packet. This means that fewer retransmissions are required.

Fast scheduling means that the Node B can indicate to each UE the rate the UE is allowed to transmit with. This can be done every TTI, i.e. fast. Thus, the network is able to control the interference in the system very well.

In HS-DSCH (High Speed Downlink Shared Channel), that is described in 3GPP TS 25.308 "UTRA High Speed DownLink Packet Access (HSDPA); Overall description; Stage 2, the scheduling is also located in the Node B. In HS-DSCH the scheduling is rather straight forward since the Node B scheduler has full knowledge of the data that needs to be transmitted in downlink. Based on the amount of data available for different UEs, the priority of the data and the radio channel quality which is indicated by the UE through the Channel Quality Indicator (CQI) measurements, the scheduler determines which data that should be transmitted to each UE.

On E-DCH the situation is different. The Node B scheduler has no direct information about the data that is to be transmitted from the UEs. Thus the UEs are required to indicate the amount of data available, the priority of the data, the transmitter power available etc. to the Node B through scheduling requests. When the Node B has received the scheduling request from the UE and has decided to schedule the UE based on the received scheduling requests, it transmits an absolute grant (AG), also denoted scheduling grant indicator herein, to the UE, indicating the amount of data or actually with which power the UE is allowed to transmit.

Before an uplink data burst can be transmitted, the UE must first transmit a scheduling request to the Node B, to inform the Node B that data is available for transmission. After a reception of the AG from the Node B the data burst can be transmitted. Thus, this procedure causes a delay in the beginning of a data transfer and potentially for each burst that is transmitted uplink, depending on how long the absolute grant is valid.

The delay caused by scheduling can partly be avoided by either using non-scheduled transmissions or issuing permanent absolute grants to all UEs. The non scheduled transmissions imply that the network configures a certain rate statistically that the UE is allowed to use instantaneously without sending a scheduling request. The drawback of this solution is that the configured rate must be rather high in order to support all possible traffic scenarios and may therefore require a large hardware allocation in the network and cause high interference. In the other solution, to permanently issue an absolute grant, it is possible to quickly change the value of the grant or remove the grant if the load of the network increases. However, this other solution has the drawback that the network does not know which users that really need the permanent grant and the risk is therefore that the performance of the uplink data transmission is impacted. Accordingly, it would be desired to avoid said delay and at the same time avoid the drawbacks mentioned above.

Many applications mainly involve downlink data transfer, e.g. file download, video streaming, and web surfing. The downlink scheduling only imposes a small delay unless the system load is very high. However, since most applications involve sending feedback messages in the uplink, such as Transfer Control Protocol (TCP) acknowledgements (ACK) and Radio Link Control (RLC) ACKs, the delay in uplink scheduling will affect the performance significantly of the downlink data traffic.

SUMMARY

Thus, the problem is to improve application performance.

The Node B makes it possible to improve application performance. The Node B comprises a downlink data scheduler and an uplink data scheduler, and means for transferring information associated with a downlink data transfer from said downlink data scheduler to said uplink data scheduler. Moreover, the uplink data scheduler comprises means for scheduling an uplink data transfer as a result of the transmission of said downlink data transfer.

The method, makes it possible to improve application performance. The method comprises the steps of: transferring information associated with a downlink data transfer from said downlink data scheduler to said uplink data scheduler, and scheduling an uplink data transfer as a result of the transmission of said downlink data transfer.

According to an embodiment, the uplink transfer is a response of the downlink data transfer.

According to a further embodiment, the means for scheduling an uplink data transfer comprises means for transmitting a scheduling grant indicator indicating when and/or how the UE is allowed to transmit uplink data. I.e. the scheduling grant indicator may comprise information about allowed transmit power for the UE and that the UE is allowed to transmit until further notice.

An advantage with the technology described herein is that it allows uplink response messages such as TCP ACKs, RLC ACKs and RRC response messages to be transmitted without scheduling delay, i.e. the scheduling request phase can be omitted. This will improve the performance for a large range of applications.

DETAILED TECHNICAL DESCRIPTION OF THE INVENTION

As stated above it would be desirable to be able to start an uplink transmission without performing a preceding scheduling request, in particular when the uplink transmission is a response of a previously transmitted downlink transmission.

That is achieved by the Node B shown comprising a downlink data scheduler 202, an uplink data scheduler and means for transferring information associated with a downlink data from said downlink data scheduler to said uplink data scheduler. The uplink data scheduler comprises means for scheduling an uplink data transfer, as a result of the transmission of said downlink data transfer The scheduler for the downlink traffic is located in the same Node B as the scheduler for the uplink traffic. That is the case when the HS-DSCH serving Node B is the same as the E-DCH serving Node B. For HS-DSCH and E-DCH, the serving Node B is that Node B that is adapted to schedule the UE. For HS-DSCH, the serving Node B also transmits data to the UE.

When the HS-DSCH scheduler schedules a data burst in the downlink to a UE, it informs the E-DCH uplink scheduler that the downlink data has been scheduled, or will be scheduled within a certain time period. When the E-DCH scheduler receives this indication, it allocates a scheduling grant, also denoted absolute grant, for the UE for uplink resources. It is then possible for the UE to send response messages such as TCP ACKs, RLC ACKs, RRC response messages on the scheduled uplink resources. The uplink response messages can be transmitted without a prior scheduling request phase, which results in a decreased delay.

According to a preferred embodiment, the uplink transfer is a response of the downlink data transfer, i.e. the response may be a response message such as TCP ACKs, RLC ACKs and RRC response messages.

For scheduling an uplink data transfer, a scheduling grant indicator is transmitted, also denoted absolute grant indicator, on a downlink channel adapted to schedule the uplink data transfer. The scheduling grant indicator indicates when and/or how the UE is allowed to transmit uplink data. The scheduling grant indicator may comprise information about allowed transmit power for the UE and that the UE is allowed to transmit until further notice. The scheduling grant indicator may also indicate that the UE is allowed to transmit during a specific time interval.

The scheduling grant indicator may be transmitted simultaneously as the transmission of said downlink data transfer.

According to embodiments, the scheduling grant indicator for the uplink scheduling is sent on the existing scheduling channel adapted to schedule the uplink, the enhanced Absolute Grant Channel (E-AGCH). However, the absolute grant indicator for the uplink may also be included in a downlink message transmitted together with the downlink data transmission, i.e. on the same channel e.g. on the HS-DSCH.

The E-DCH scheduler may allocate a fixed preconfigured uplink resource to a UE that already is scheduled in the downlink. If the UE needs to transmit uplink information, e.g. TCP ACK, RLC ACK, or a RRC response message, in response to the received downlink data, the absolute grant indicator allocates uplink resources for the uplink data within a rather short time period after the downlink data was received e.g. within 200 ms. After that time period has elapsed or after the first transmission in uplink, the scheduler can reduce the absolute grant to zero to free uplink resources for other UEs.

According to a further embodiment, the absolute grant allocated to the UE in uplink may depend on the amount of data, or the data rate used, in downlink. In a preferred embodiment the absolute grant allocated to the UE in uplink may depend on the amount of data, or the data rate used, in downlink in addition to the time aspect described above. As an example the amount of allocated uplink resources indicated by the absolute grant indicator may be proportional to the amount of downlink data, i.e. the amount of uplink data that is allowed to be transmitted is proportional to the amount of transmitted downlink data. Preferably, a rule for TCP applications is that roughly 1-3% of the downlink data rate is needed for TCP ACKs in uplink if no header compression is used.

It should be noted that for applications using TCP the first request for data is transmitted in uplink and that request will not benefit from this invention. However, once the TCP data transfer has started, the data is transmitted in bursts separated by some time (in the slow start phase). Each of these bursts will benefit from the invention and the total time to e.g. download a file will thus be decreased.

In the drawings and specification, there have been disclosed typical preferred embodiments and, although specific terms are employed, they are used in a generic and descriptive sense only and not for purposes of limitation, the scope of the invention being set forth in the following claims.

The invention claimed is:

1. A node B base station comprising:
  a downlink data scheduler;
  an uplink data scheduler;
  means for transferring information associated with a downlink data transfer of a data packet received from a data packet network intended for a user equipment (UE) from said downlink data scheduler to said uplink data scheduler,
  wherein the uplink data scheduler is configured to schedule an initial uplink transfer of uplink data to be transmitted by the user equipment (UE) for a first time over a radio interface using said information as a result of transmitting said downlink data over the radio interface,
  wherein the uplink data scheduler is further configured to schedule the initial uplink transfer of the uplink data by the user equipment (UE) for the first time over the radio interface independently and regardless of whether a request to transmit the data by the user equipment (UE) has been received by the node B base station.

2. The node B base station according to claim 1, wherein the uplink transfer of the data is in response to the downlink data transfer.

3. The node B base station according to claim 1, further comprising means for transmitting a scheduling grant indicator indicating when and/or how the UE is allowed to transmit the uplink data over the radio interface to the node B.

4. The node B base station according to claim 1, further comprising means for transmitting a scheduling grant indicator simultaneously with the transmission of said downlink data.

5. The node B base station according to claim 1, further comprising means for transmitting a scheduling grant indicator included in a downlink message transmitted on a same channel as the downlink data transmission.

6. The node B base station according to claim 1, further comprising means for transmitting a scheduling grant indicator on a downlink channel adapted to schedule the initial uplink transfer of the uplink data.

7. The node B base station according to claim 6, wherein the downlink channel adapted to schedule the uplink data transfer is an enhanced Absolute Grant Channel.

8. The node B base station according to claim 1, wherein the uplink data scheduler is further configured to schedule the initial uplink transfer of the uplink data within a predefined time period after the downlink data is received.

9. The node B base station according to claim 1, further comprising means for allocating an amount of uplink resources in relation to an amount of transmitted downlink data.

10. The node B base station according to claim 1, wherein the node B is implemented in a Universal Mobile Telephone System.

11. A method in a Node B base station comprising a downlink data scheduler and an uplink data scheduler the method comprising the steps of:
    transferring information associated with a downlink data transfer of a data packet received from a data packet network intended for a user equipment (UE) from said downlink data scheduler to said uplink data scheduler, and
    scheduling an initial uplink transfer of uplink data to be transmitted by the user equipment (UE) for a first time over a radio interface using said information as a result of transmitting said downlink data over the radio interface including scheduling the initial uplink transfer of the uplink data by the user equipment (UE) for the first time over the radio interface independently and regardless of whether a request to transmit the data by the user equipment (UE) has been received by the node B base station.

12. The method according to claim 11, wherein the uplink transfer is in response to the downlink data transfer.

13. The method according to claim 11, wherein the step of scheduling the uplink transfer comprises the further step of transmitting a scheduling grant indicator indicating when and/or how the UE is allowed to initially transmit the uplink data over the radio interface to the node B base station.

14. The method according to claim 13, wherein the step of scheduling the uplink transfer comprises the step of transmitting a scheduling grant indicator simultaneously as the transmission of said downlink data.

15. The method according to claim 14, wherein the step of scheduling the uplink transfer comprises the step of transmitting a scheduling grant indicator included in a downlink message transmitted on a same channel as the downlink data transmission.

16. The method according to claim 11, wherein the step of scheduling the uplink transfer comprises the step of transmitting a scheduling grant indicator on a downlink channel adapted to schedule the initial uplink transfer of the uplink data.

17. The method according to claim 16, wherein the downlink channel adapted to schedule the initial uplink transfer of the uplink data is an enhanced Absolute Grant Channel.

18. The method according to claim 11, wherein the step of scheduling the initial uplink transfer of the uplink data comprises the step of scheduling the initial uplink transfer of the uplink data within a predefined time period after the downlink data is received.

19. The method according to claim 11, wherein the step of scheduling the initial uplink transfer of the uplink data comprises the step of allocating an amount of uplink resources in relation to an amount of transmitted downlink data.

* * * * *